US008572287B2

(12) United States Patent
Ahmed et al.

(10) Patent No.: US 8,572,287 B2
(45) Date of Patent: Oct. 29, 2013

(54) METHOD AND APPARATUS FOR COMMUNICATING COMPRESSION STATE INFORMATION FOR INTERACTIVE COMPRESSION

(75) Inventors: Salmaan Ahmed, Waterloo (CA); David P. Sze, Waterloo (CA); Steven Chan, Kitchener (CA)

(73) Assignee: BlackBerry Limited, Waterloo (CA)

( * ) Notice: Subject to any disclaimer, the term of this patent is extended or adjusted under 35 U.S.C. 154(b) by 428 days.

(21) Appl. No.: 12/031,211

(22) Filed: Feb. 14, 2008

(65) Prior Publication Data

US 2009/0210479 A1    Aug. 20, 2009

(51) Int. Cl.
    *G06F 15/16*    (2006.01)
(52) U.S. Cl.
    USPC .......................................................... 709/247
(58) Field of Classification Search
    USPC .............. 709/247; 455/72; 715/242; 707/101
    See application file for complete search history.

(56) References Cited

U.S. PATENT DOCUMENTS

| | | | | |
|---|---|---|---|---|
| 5,951,623 A * | 9/1999 | Reynar et al. | ................. | 708/203 |
| 5,953,503 A * | 9/1999 | Mitzenmacher et al. | ..... | 709/203 |
| 6,801,141 B2 | 10/2004 | Yang et al. | | |
| 6,856,651 B2 * | 2/2005 | Singh | ............................ | 375/240 |
| 6,985,934 B1 * | 1/2006 | Armstrong et al. | ........... | 709/219 |
| 7,155,173 B2 * | 12/2006 | Leung et al. | ..................... | 455/72 |
| 7,348,904 B2 * | 3/2008 | Christoffersson et al. | .... | 341/106 |
| 7,401,105 B2 * | 7/2008 | Carro | ..................................... | 1/1 |
| 2002/0056010 A1 * | 5/2002 | Lincoln et al. | ..................... | 709/247 |
| 2004/0045030 A1 | 3/2004 | Reynolds et al. | | |
| 2004/0059835 A1 * | 3/2004 | Liu et al. | ........................ | 709/247 |
| 2005/0027731 A1 * | 2/2005 | Revel | ............................. | 707/101 |
| 2005/0207664 A1 * | 9/2005 | Ramasastry et al. | ........... | 382/240 |
| 2006/0009150 A1 * | 1/2006 | Leung et al. | .................. | 455/3.01 |
| 2006/0120356 A1 | 6/2006 | Lee et al. | | |
| 2006/0168323 A1 | 7/2006 | Kim et al. | | |
| 2007/0294728 A1 * | 12/2007 | Quere et al. | ..................... | 725/41 |

OTHER PUBLICATIONS

European Search Report, European Patent Application No. 08151465.5 dated Sep. 11, 2008.
Examiner's Report dated Apr. 9, 2013, issued from the corresponding Canadian patent application No. 2,652,188.

\* cited by examiner

*Primary Examiner* — Duyen Doan
(74) *Attorney, Agent, or Firm* — Geoffrey deKleine; Borden Ladner Gervais LLP

(57) ABSTRACT

A method of determining, at a mobile device, side information including compression state information. The method includes receiving, from a server, a unique side information identifier identifying a unit of side information used by the server for compressing data, determining, based on the side information identifier, if the unit of side information is resident on said device, and if the unit of side information is resident on the mobile device, loading the side information for decompressing the data. Otherwise, if the unit of side information is not resident on the mobile device, the method includes requesting the unit of side information from one of the server and another device.

15 Claims, 12 Drawing Sheets

METHOD AND APPARATUS FOR COMMUNICATING COMPRESSION STATE INFORMATION FOR INTERACTIVE COMPRESSION

FIELD OF THE INVENTION

The present invention relates to a method of communicating compression state information for decompression of data.

BACKGROUND OF THE INVENTION

In the field of data communication, data is typically compressed so that the amount of information being transmitted is reduced. Such data compression enables less traffic and therefore faster transmission. Compression also reduces storage requirements, which is especially important in communication to portable or mobile communication devices with limited storage capacity. In conventional communication between a server and a mobile communication device, requested data, such as message data, a website, or a digital file, is encoded, or compressed, by the server, and then transmitted. A decoder at the mobile communication device decodes the compressed data, and processes it appropriately, for example, displaying it to the user.

Side information, or a priori information shared by both the encoder and decoder, can be used in the compression and decompression of transmitted data to improve compression performance. The choice of side information influences the compression ratio achieved by the compression. Significantly improved compression can be achieved in systems, known as interactive compression systems, that maintain shared caches of side information. A class of such systems is grammar-based compression of which Yang-Kieffer (YK) data compression is a member. Side information that is correlated with the data being compressed is utilized in YK compression to build a grammar and collect frequency counts. This is used to achieve better compression of the data being compressed.

It is important that both encoder and decoder use the same side information in compression and decompression, thereby using the same parameters (e.g. YK grammar and frequency counts) for compression and decompression, respectively. It is therefore desirable to provide a method of communicating side information for interactive compression.

It is an object of the present invention to obviate or mitigate at least one disadvantage of previous methods of interactive compression.

BRIEF DESCRIPTION OF THE DRAWINGS

Embodiments of the present invention will now be described, by way of example only, with reference to the attached Figures, wherein.

DETAILED DESCRIPTION

Figure 1:
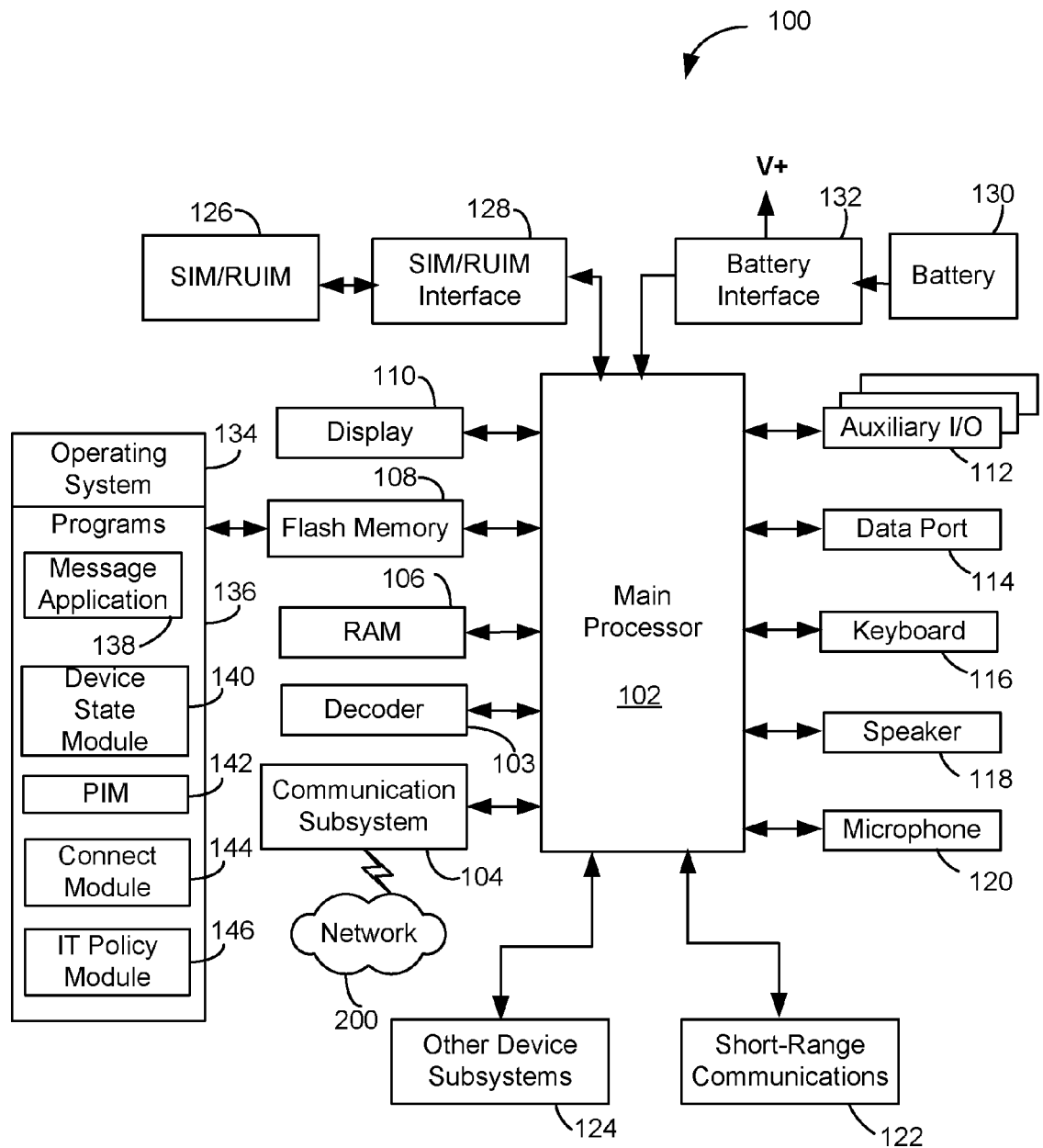
FIG. 1 is a block diagram of an exemplary embodiment of a mobile communication device.

Generally, described is a method and system for performing interactive compression for communication between parties, such as a server and a mobile communication device. In an embodiment, the interactive data compression is performed using a lossless data compression, such as that described in U.S. Pat. No. 6,801,141 to Yang et al., which is hereby incorporated by reference. This type of data compression, using grammar transforms, or rules, is also known as Yang-Kieffer (YK) data compression. In YK data compression, data is compressed into an irreducible grammar form from which the original data may be recovered. The grammar form of previously compressed data can be used in compression of related data, particularly when dealing with data having similar properties and/or content. This grammar form can be used for subsequent compressions by storing parameters, such as the actual grammar production rules and frequency counts, as compression state information, and can result in much enhanced compression, particularly in terms of increased speed of compression and reduced use of processing resources.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. Data received by the mobile device 100 can be decompressed and decrypted by decoder 103, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an information technology (IT) policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
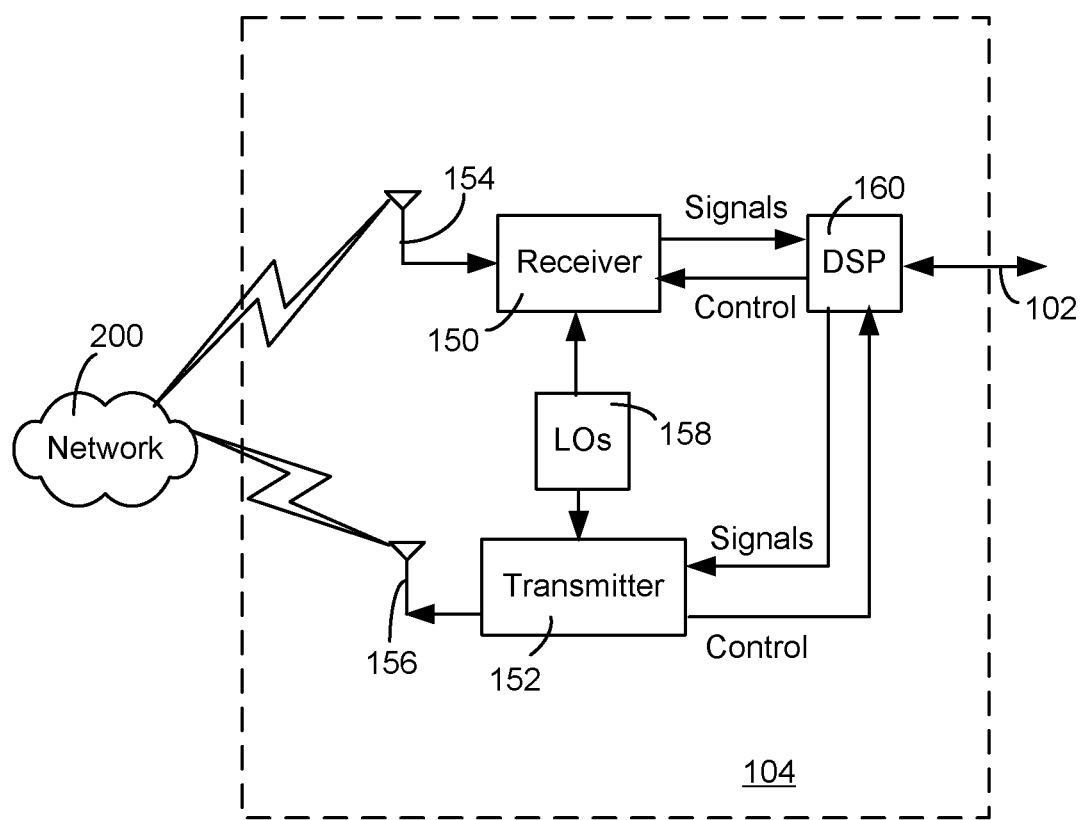
FIG. 2 is a block diagram of an exemplary embodiment of a communication subsystem component of the mobile device of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that should be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
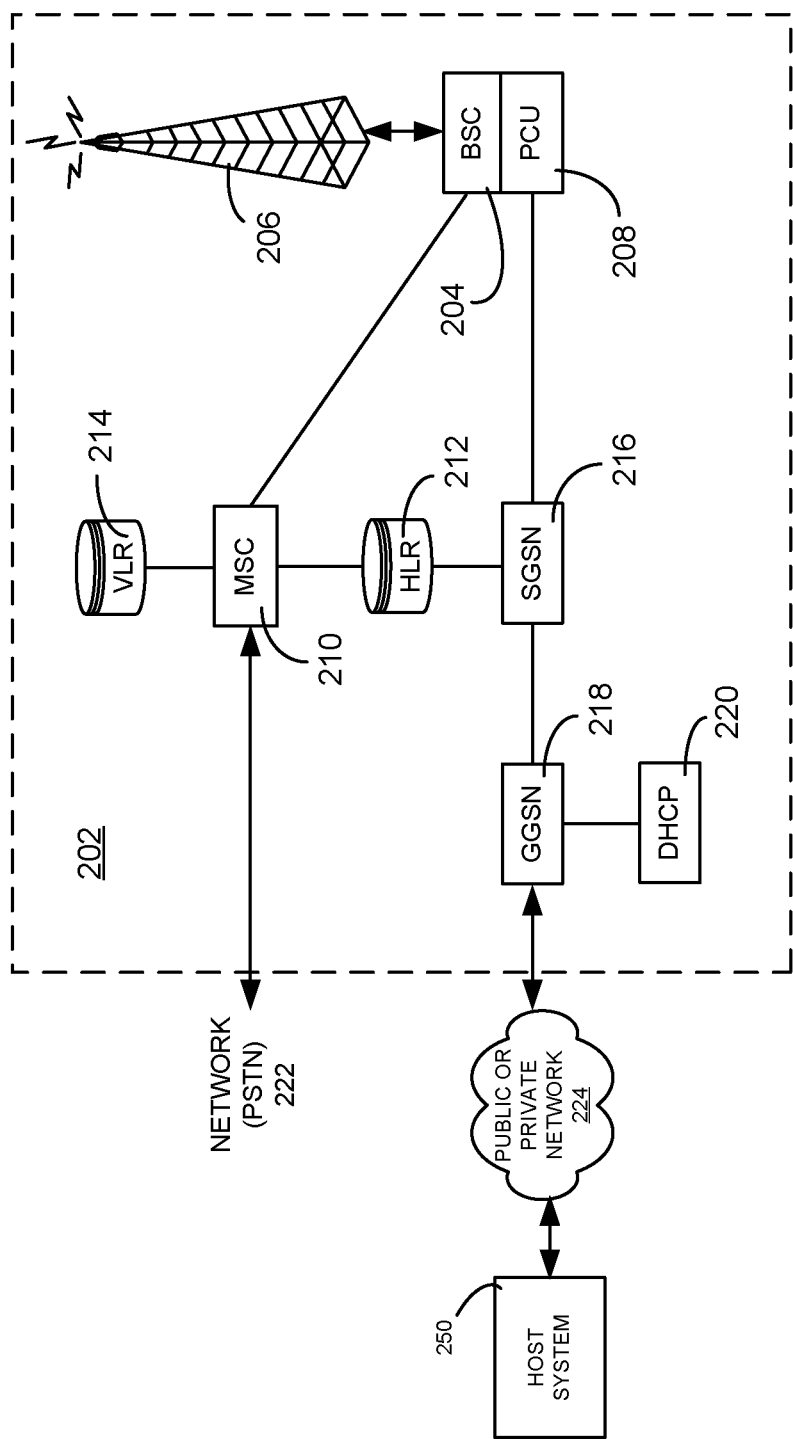
FIG. 3 is an exemplary block diagram of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the mobile device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
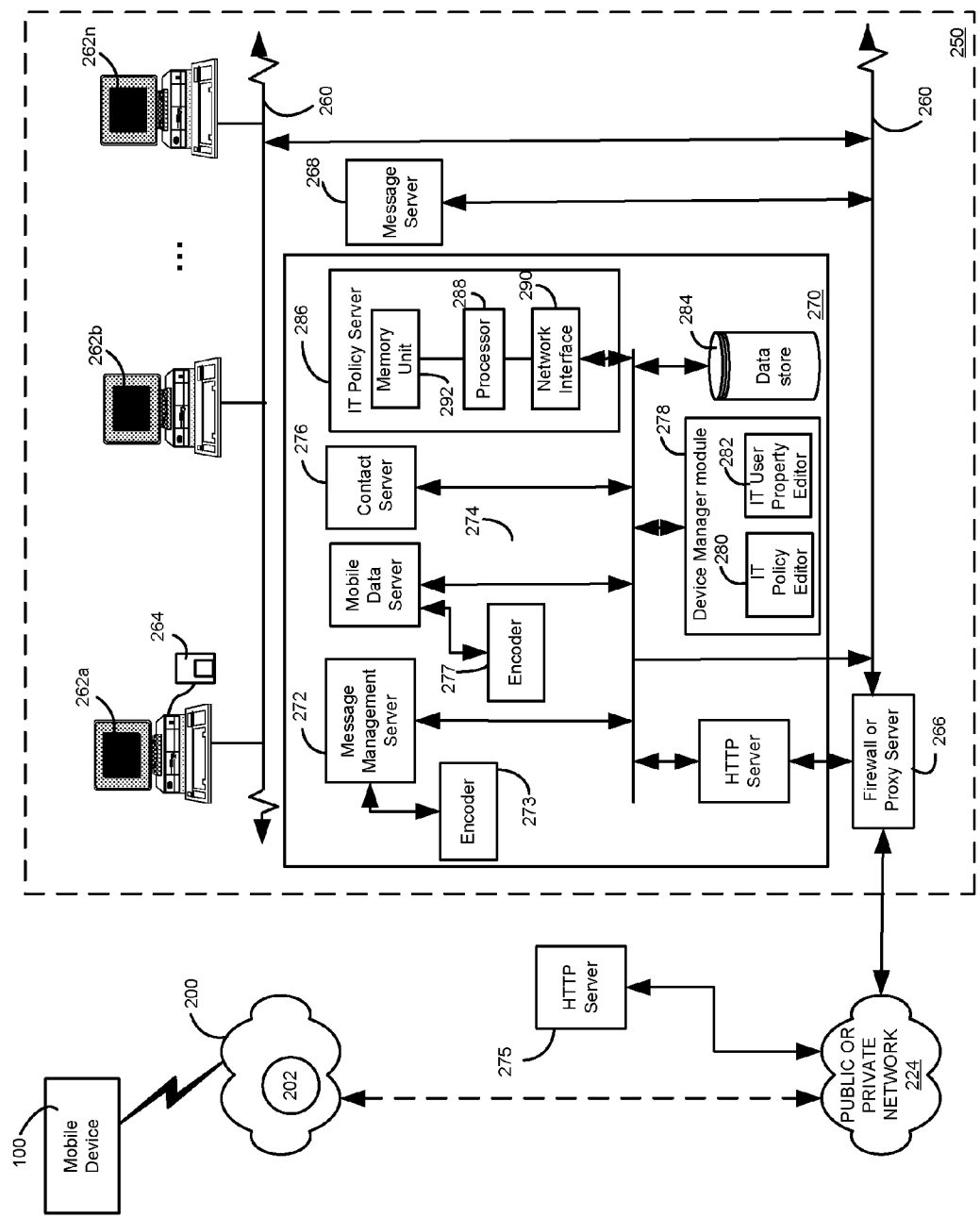
FIG. 4 is a block diagram illustrating components of a host system in one exemplary configuration for use with the wireless network of FIG. 3 and the mobile communication device of FIG. 1.

Referring now to FIG. 4, shown therein is a block diagram illustrating components of an exemplary configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino Server™, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's IT policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to message management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the mobile device 100 via the shared network infrastructure 224 and the wireless network 200.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the MDS 274, the HTTP server 275, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

Figure 5:
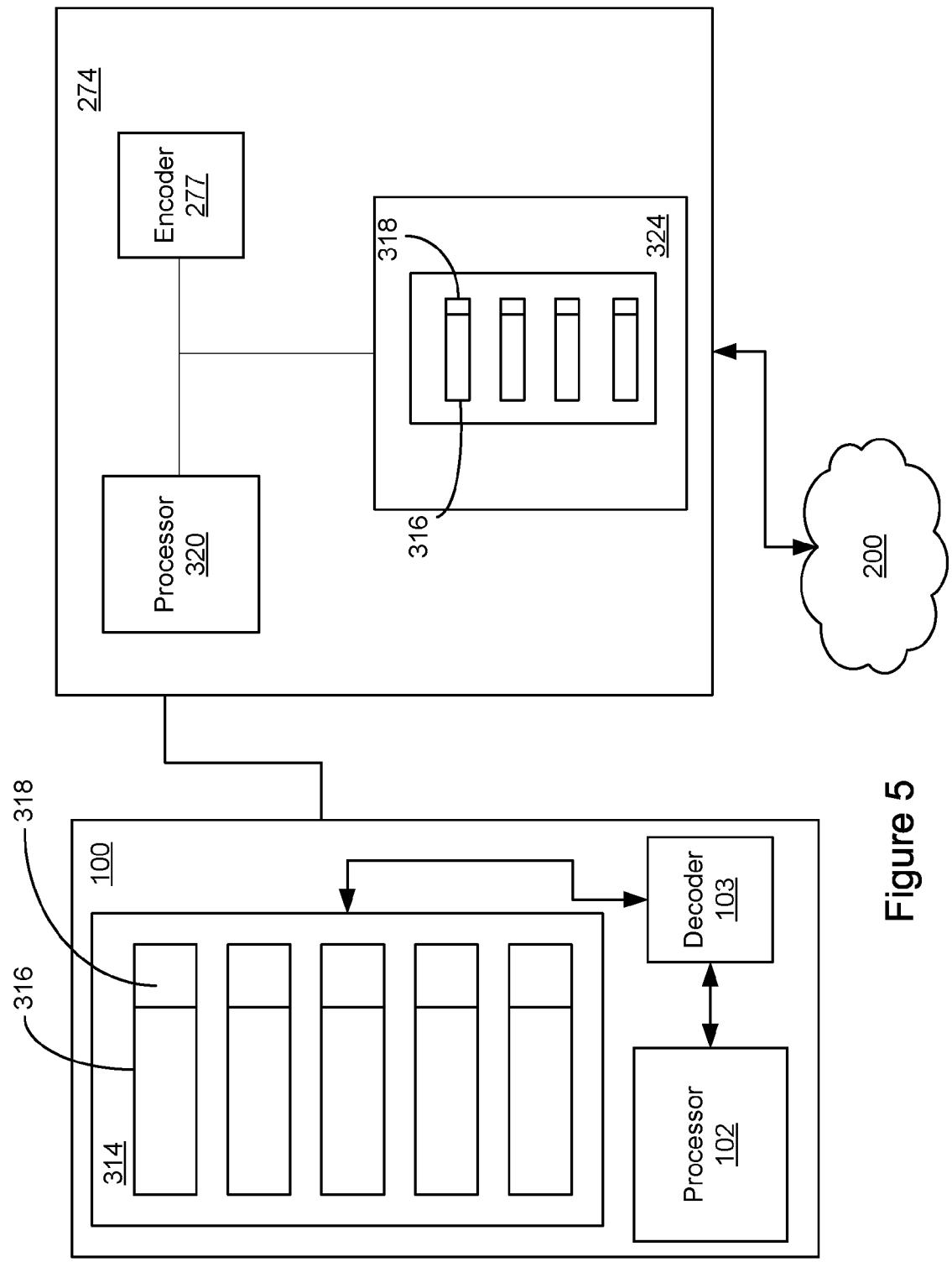
FIG. 5 is a schematic view of a mobile communication device and a server.

Referring to FIG. 5, a schematic view of the mobile device 100 and a server, such as MDS 274, the message management server 272 or any other server involved in the transfer of information or data to and from the mobile device 100 is shown. The mobile device 100 and the server can be seen as communicating parties for a method of interactive compression.

The mobile device 100 includes a main processor 102, a decoder 103, and a device side information database 314, which can also be described as a cache, store, or repository. The device side information database 314 stores units of side information 316. Side information is a priori information that is known to both the encoder and decoder. It can be correlated with the data that is being compressed, such as emails in the same thread or web pages from the same site and is used to improve compression. In order to be able to decode data compressed using side information, the decoder uses the same side information that was used by the encoder. This side information can be represented in different forms including but not limited to compression state information 318. The compression state information 318 includes parameters, such as grammar, which consists of production rules and/or frequency statistics, of previously completed compressions. As previously noted, the compression state information from previously completed compressions can improve compression of subsequent data having similar properties and/or content. The server includes a processor 320, and has access to an encoder, such as encoder 277, and a server side information database 324. The encoder 277 and the server side information database 324 can be integral with the server, or separate therefrom. The server side information database 324 generally contains side information, including compression state information, associated with multiple mobile devices. The server is connected to the network 200 so that it may retrieve data from other servers connected to the network, such as HTTP server 275, as is described in more detail below. The side information stored in the respective side information databases 314 and 324 can be organized in any suitable manner for searching and retrieval by the device side decoder 103 and the server side encoder 277, respectively.

In a semi-static side information case, new units of side information are not generated and updated frequently at the encoder side, as compared to a dynamic side information case where side information is frequently updated and created. Thus, the side information is also not updated frequently at the decoder side. The side information stored at the mobile device can be updated when a unit of side information is used that the mobile device does not have. Thus, side information is only transmitted when required by the decoder at the mobile device for decompressing the data.

Interactive compression according to the present invention can be generally understood by reference to an exemplary transmission to the mobile device 100, such as an HTTP webpage.

Figure 6:
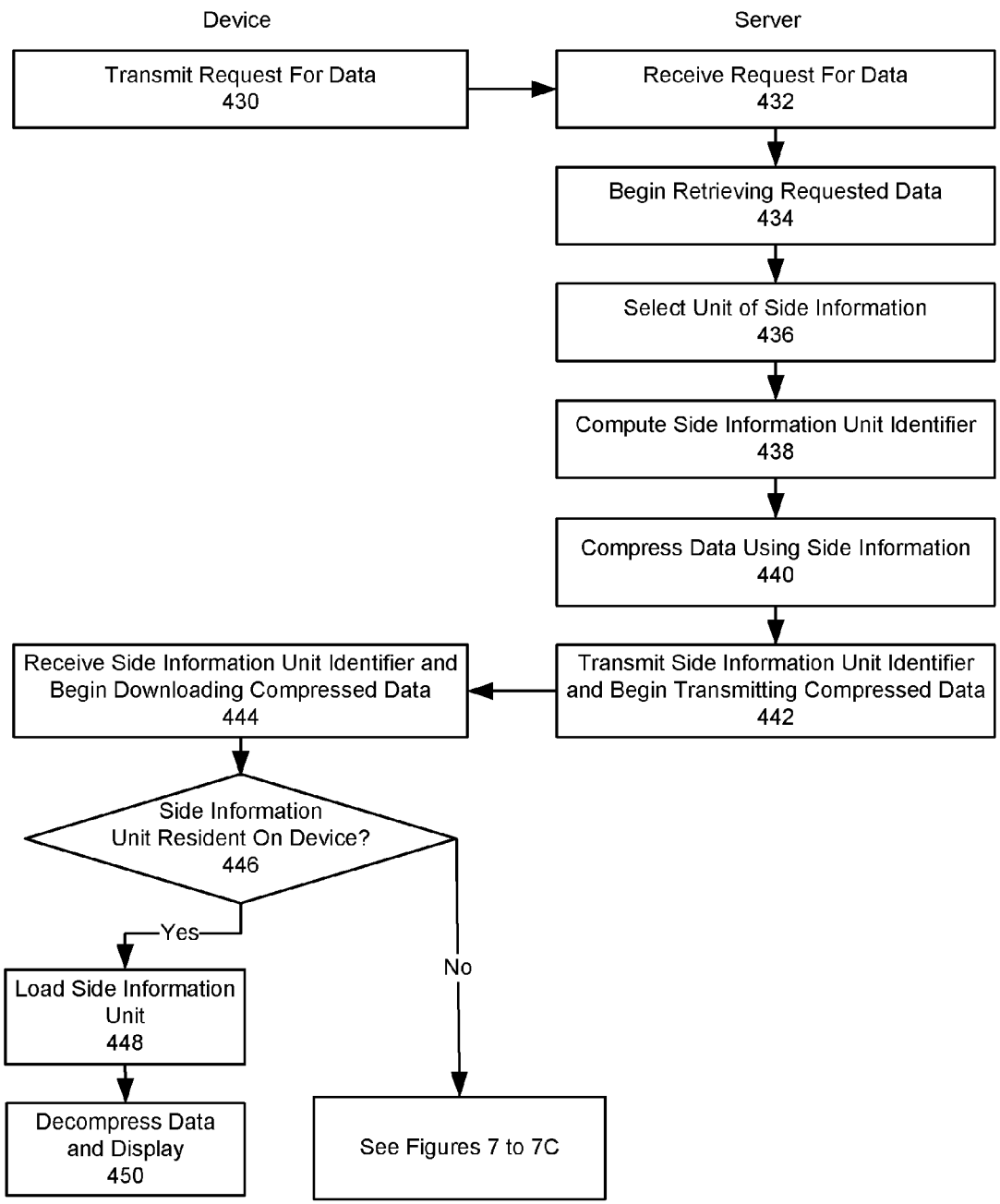
FIG. 6 is a flowchart showing a method of interactive compression for communication between the server and the mobile communication device.

FIG. 6 is a flowchart of a method of interactive compression for communication between the server and the mobile device 100. The mobile device 100 identifies data to request, such as a webpage identified by a Uniform Resource Locator (URL), and a request for the identified data is transmitted from the mobile device 100 to the server along with an indication that the mobile device 100 is YK-enabled (step 430). The request therefore includes an indication that the decoder 103 can accept content compressed using side information. In the example of the HTTP webpage, a request header is sent from the decoder 103 to the encoder 277, including the requested URL, and the indication that the decoder 103 can accept content compressed using side information. An exemplary request header can include, for example:

GET/HTTP/1.1
Host: www.example.com
Accept-Encoding: gzip, side-info-impl
Connection: keep-alive In this example, the "Accept-Encoding" field in the request header indicates to the encoder that the decoder is able to accept content compressed using side information. The mobile device 100 then awaits receipt of the requested data transmitted from the server.

The request sent from the mobile device 100 is received at the server (step 432) and the server identifies the requested data and begins retrieving the identified requested data (step 434 The requested data can be located within the server or can be accessible through a remote server, such as HTTP server 275, over the network 200. Continuing with the above example of requesting an HTTP webpage, the requested data is identified using the URL provided in the request header and the server begins retrieving the requested data from the webpage. A unit of side information is then selected for data compression based on the format of data retrieved (step 436). The unit of side information can be selected in any suitable manner. For example, side information can be user-specific and a single unit of side information can be stored in the server side information database 324 for the user of the mobile device 100 as a unit of side information is stored for each different server user. In this example, the unit of side information can be selected and retrieved based on, for example, user name. In another example, a single unit of side information can be stored in the server side information database 324 for all users. In still another example, units of side information can be group-specific such that different units of side information are used for different groups.

Upon selection of the unit of side information, a unique identifier is computed for the unit of side information (step 438). Alternatively, the unique identifier can be stored with the side information and retrieved. Thus, the unique identifier is previously computed and stored. The unique identifier is employed to ensure that the decoder 103 of the mobile device 100 uses the same unit of side information for decompression as the encoder 277 uses for compression on the server side. The unique identifier can be any identifier that uniquely identifies the unit of side information, such as a hash of the bytes of side information along with other information such as the length of the side information in bytes. Thus, the unique identifier is computed by performing a hashing operation such as MD5, MD4, SHA-1, CRC-32, CRC-16 or any other suitable hashing operation that provides a good hash distribution and the length of the side information, in bytes, is included. To ensure the unique identifier is truly unique, other information can be incorporated into the unique identifier. For example, a portion or form of the URL can be included in the unique identifier for an HTTP based application. Other information can also be included to form the unique identifier such as a modification date and time of the unit of side information, a version number of the unit of side information, and/or a randomly generated number.

After beginning retrieving the data and selecting the unit of side information, the server compresses the data (step 440), using compression state information associated with the selected unit of side information. The server then transmits a response to the mobile device 100. The compression method used is identified in the response sent to the mobile device 100 along with the identifier of the unit of side information (step 442). The requested data is then transmitted. Rather than waiting for all of the requested data to be retrieved, the server can begin streaming the response to the mobile device 100 shortly after beginning retrieval of the requested data (when the requested data begins to arrive). It will now be appreciated that there may be a minimum amount that the server retrieves before the side information is selected and before starting to transmit the data. For example, the server may require receipt of the entire HTTP header prior to selection of the side information for compression. It will now be appreciated that it is not necessary that all the data be retrieved at the server prior to selecting the unit of side information and prior to beginning compressing and transmitting.

Continuing still with the above example of requesting an HTTP webpage, an HTTP response header is sent from the encoder 277 to the decoder 103. The HTTP response header indicates the compression method used in compressing the data at the encoder 277 as well as the unique identifier of the unit of side information used. An exemplary HTTP response header can include, for example:

HTTP/1.1 200 OK
Connection: close
Content-Type: text/html
Content-Encoding: side-info-impl
X-Side-Info-Identifier: 0xE323FA21

In this example, the unit of side information used is identified using the unique identifier 0xE323FA21.

The response including the unique identifier of the unit of side information is received at the mobile device 100 (step 444) and it is determined if the decoder 103 has the unit of side information identified by comparing the unique identifier received in the response (step 446) to unique identifiers stored in association with the respective unit of side information. If the unit of side information is resident on the device 100, in the side information database 314, the decoder 103 loads the unit of side information identified by the unique identifier (step 448) and the received data is decompressed using the unit of side information and rendered on the display 110 (step 450). In the embodiment described above with reference to FIG. 6, data is sent to the mobile device in response to receipt of a request for data. It will be appreciated that data such as email data can be sent to the mobile device 100 in a "push" operation, and therefore, a unit of side information is selected and the data is compressed and sent automatically without receipt of a request for data transmission.

Figure 7:
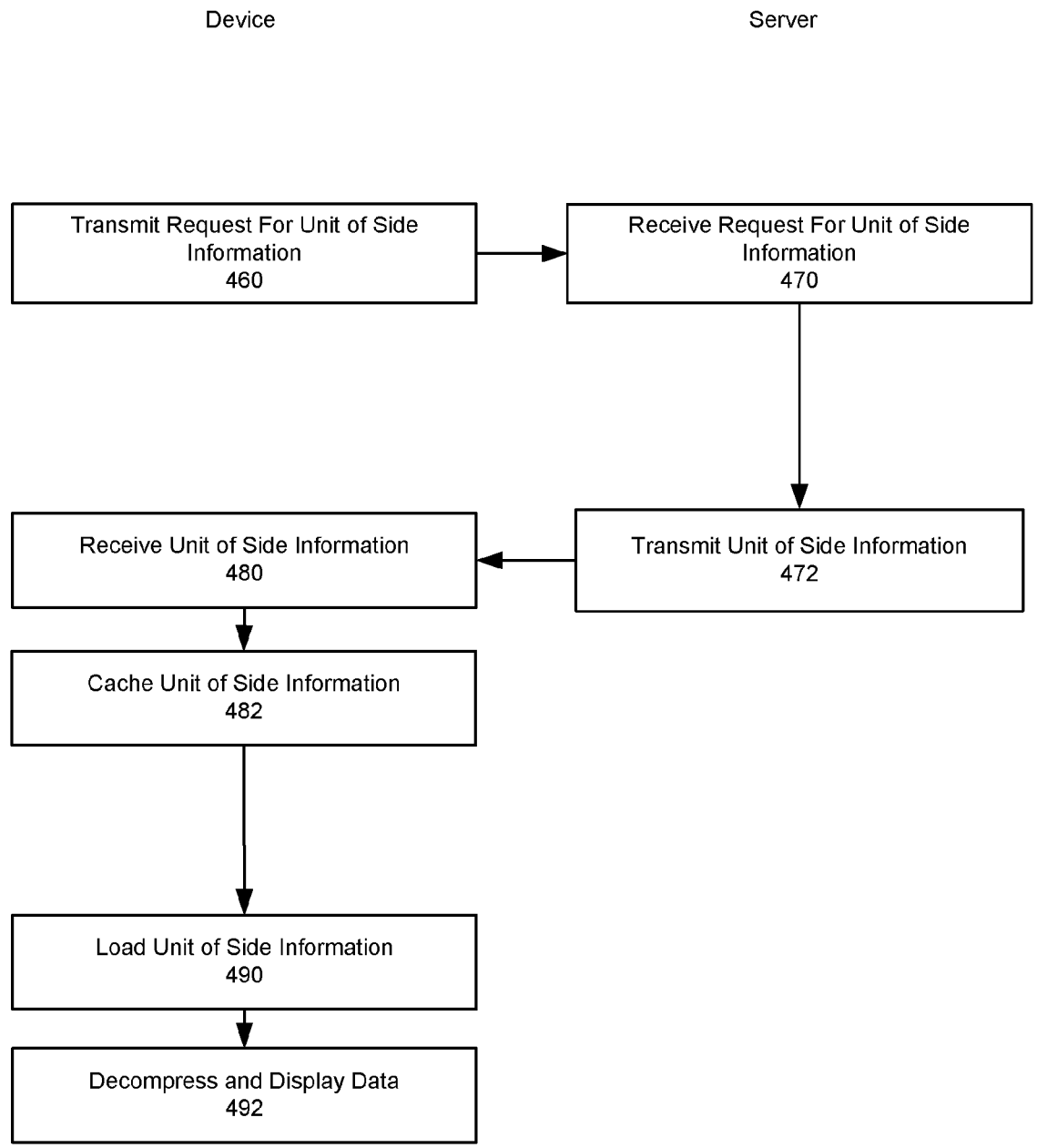
FIG. 7 is a flowchart a flowchart showing further steps in a method of interactive compression for communication between the server and the mobile device.

Reference is now made to FIG. 7, which shows a flowchart of further steps in a method of interactive compression for communication between the server and the mobile device 100, to describe a method of obtaining the unit of side information when the decoder 103 does not have the unit of side information. Thus, it is determined at step 446 of FIG. 6 that the decoder 103 does not have the unit of side information identified by the unique identifier received in the response and therefore the unit of side information is not resident on the device 100. Upon determination that the unit of side information is not resident on the device 100, the decoder 103 requests the unit of side information that was used for compression (step 460). The request for the unit of side information can be generated in any suitable manner. For example, the request for the unit of side information can be made using the same protocols used for requesting the content (HTTP in the above example). Alternatively, the request for the unit of side information can be made using a different protocol. Thus, the request can be made using any suitable protocol. Further, the unit of side information can be requested from the same sever that generated and transmitted the response received at step 444 or can be requested from any other suitable location such as a repository of side information accessible by both the encoder 277 and the decoder 103.

The request is received at a server (step 470), which can be the same server that generated and sent the response or, alternatively can be another suitable server that has access to the repository of side information referred to above. The unit of side information is identified using the unique identifier, retrieved and transmitted from the server for delivery to the mobile device 100 (step 472).

The unit of side information is then received at the mobile device 100 for use in decompressing the data requested at step 430 (step 480). The unit of side information received at step 480 is cached (step 482), adding the unit of side information to the device side information database 314 in case the same unit of side information is used again for decompressing data. The device side information database 314 can store more than one unit of side information as units of side information may only apply to specific types of content, or to content from specific sources. Data received at the decoder may be received in a different order than the order sent by the encoder. Storage of the unit of side information permits the use of the side information multiple times without having to request the same unit of side information multiple times.

The unit of side information is loaded into the decoder 103 (step 490). The received data is decompressed using the unit of side information and rendered on the display 110 (step 492).

Figure 7A:
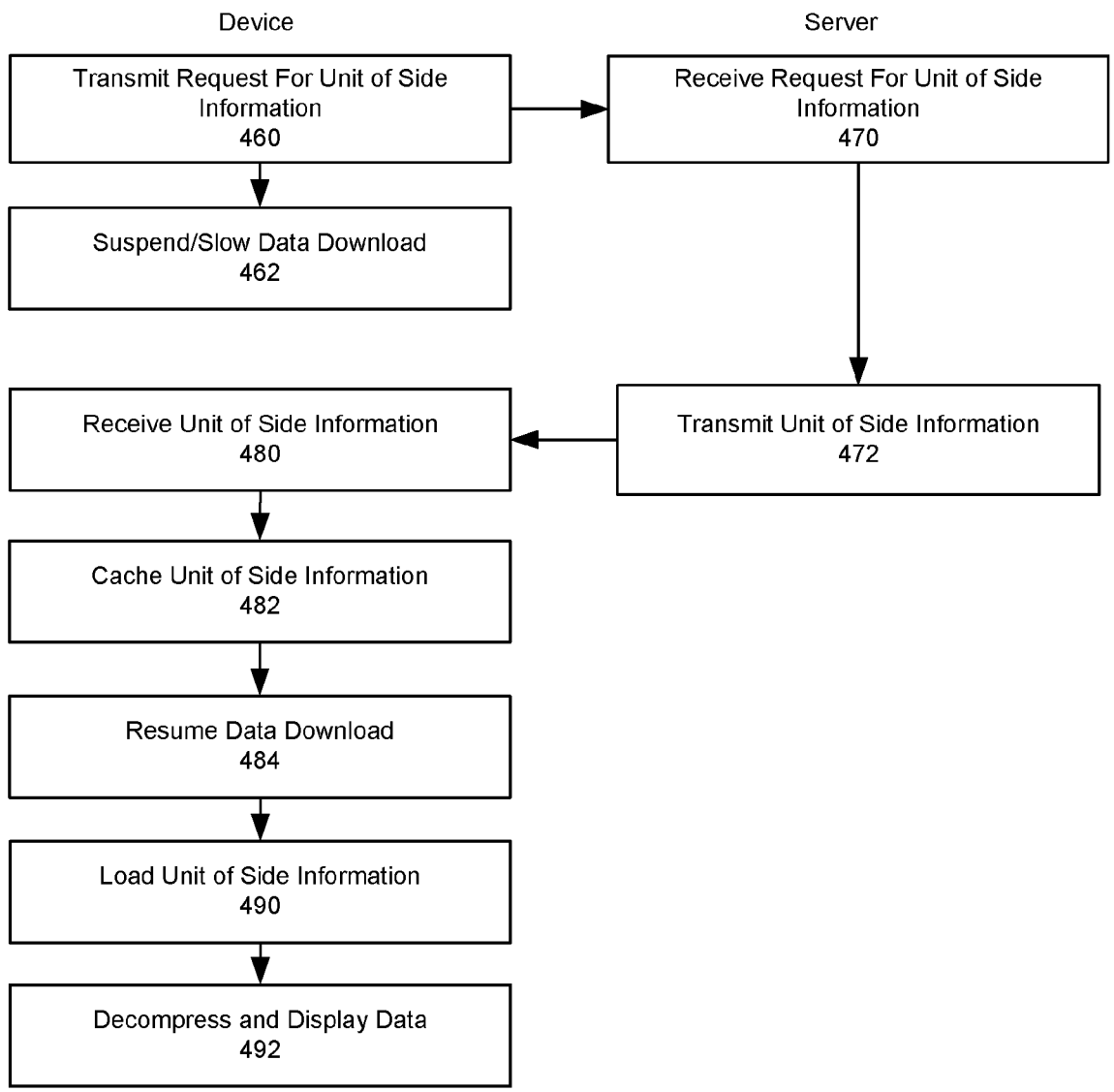
FIG. 7A is a flowchart showing a specific embodiment of the method of FIG. 7.
Figure 7B:
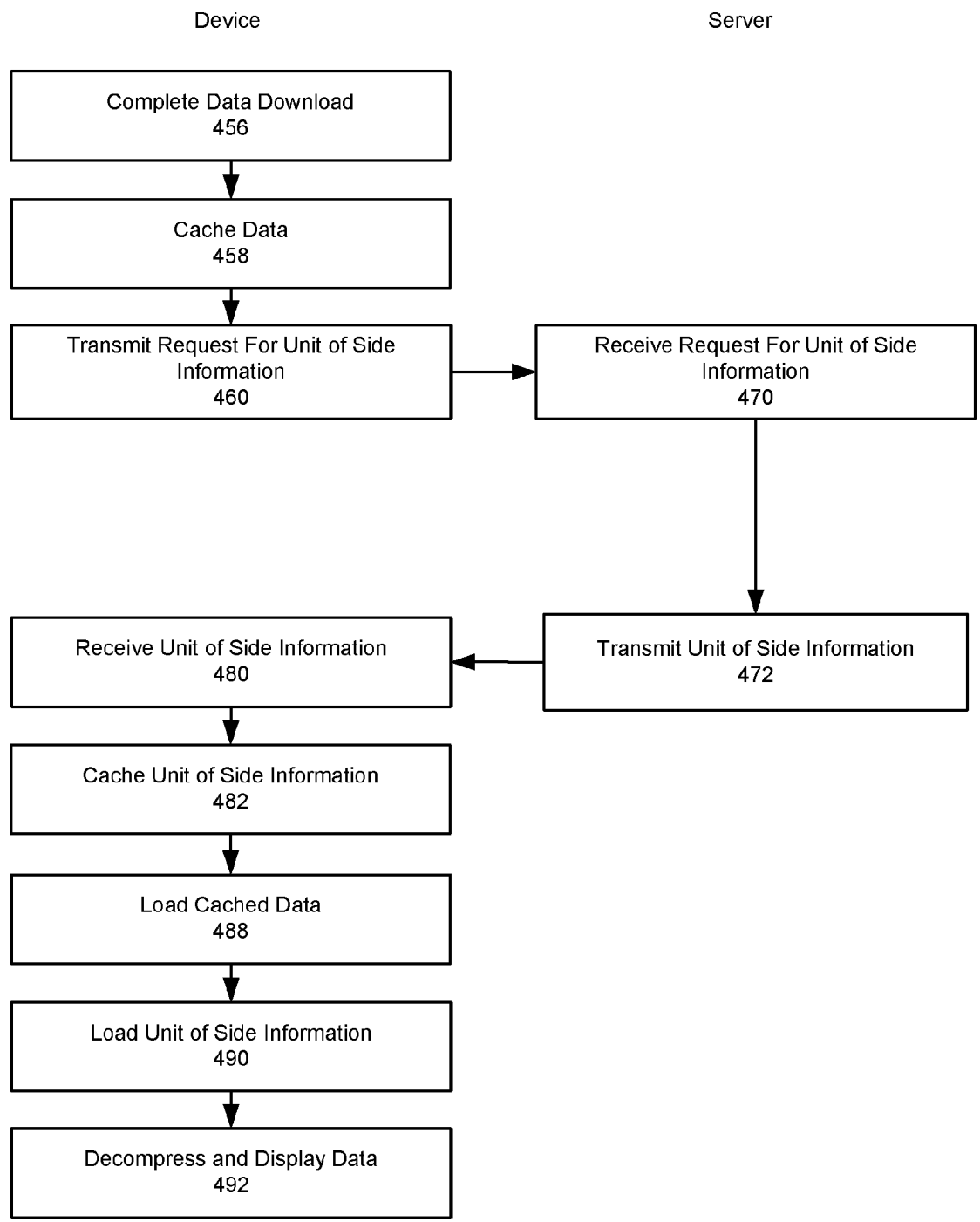
FIG. 7B is a flowchart showing another specific embodiment of the method of FIG. 7.
Figure 7C:
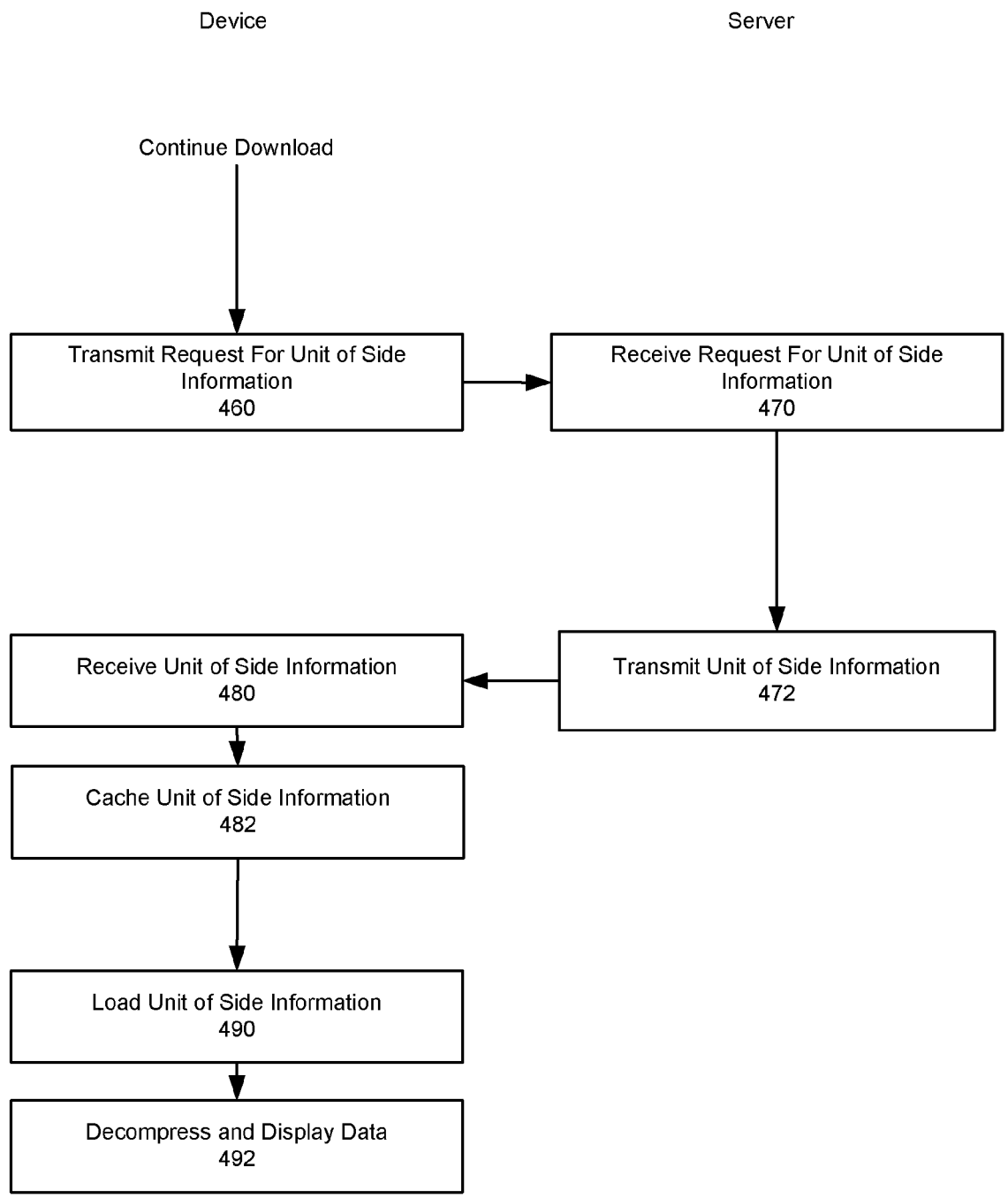
FIG. 7C is a flowchart showing yet another specific embodiment of the method of FIG. 7.

FIGS. 7A to 7C show specific exemplary embodiments of obtaining the unit of side information in accordance with the method of interactive compression for communication between the server and the mobile device 100 described above with reference to FIG. 7. Reference is first made to FIG. 7A to describe one specific embodiment. As described, it is determined at step 446 of FIG. 6 that the decoder 103 does not have the unit of side information identified by the unique identifier received in the response and therefore the unit of side information is not resident on the device 100. Upon determination that the unit of side information is not resident on the device 100, the decoder 103 requests the unit of side information that was used for compression (step 460). As indicated above, the request for the unit of side information can be generated in any suitable manner using any suitable protocol. Further, the unit of side information can be requested from the same sever that generated and transmitted the response received at step 444 or can be requested from any other suitable location. In the present embodiment, the mobile device suspends downloading the requested data that began at step 444 until the unit of side information is received at the mobile device 100. It is also contemplated that the download of data can be slowed rather than completely suspended at step 462. It will be appreciated that the mobile device 100 can read more slowly from the connection causing the server's flow control algorithms to transmit more slowly over that connection to slow the download of data, The request is received at a server (step 470), which can be the same server that generated and sent the response or, alternatively, can be another suitable server that has access to the repository of side information as referred to above. The unit of side information is identified using the unique identifier, then retrieved and transmitted from the server for delivery to the mobile device 100 (step 472).

The unit of side information is then received at the mobile device 100 for use in decompressing the data requested at step 430 (step 480). Upon receipt, the unit of side information is added to the device side information database 314 (step 482) and the download of requested data that was suspended at step 462 is resumed (step 484) The unit of side information received at step 480 is then loaded into the decoder 103 (step 490) and the received data is decompressed and rendered on the display 110 (step 492).

As an alternative, data transmission may be suspended or slowed by the server upon receipt of the request for side information rather than the device suspending or slowing the transmission. Other embodiments are possible in which slowing of transmission is not effected.

Reference is now made to FIG. 7B to describe another specific embodiment of obtaining the unit of side information in accordance with the method of interactive compression for communication between the server and the mobile device 100 described above with reference to FIG. 7. As described, it is determined at step 446 of FIG. 6 that the decoder 103 does not have the unit of side information identified by the unique identifier received in the response. In the present embodiment, the requested data is completely downloaded (step 456) and stored in a data cache at the mobile device 100 (step 458) prior to requesting the unit of side information that was used for compression (step 460). Thus, the download of data is not interrupted in the present example. Instead, the download of data is completed prior to generating and transmitting the request for the unit of side information. Again, the request for the unit of side information can be generated in any suitable manner using any suitable protocol. Further, the unit of side information can be requested from the same sever that generated and transmitted the response received at step 444 or can be requested from any other suitable location.

The request is received at a server (step 470), which can be the same server that generated and sent the response or, alternatively, can be another suitable server that has access to the repository of side information referred to above. The unit of side information is identified using the unique identifier, retrieved and transmitted from the server for delivery to the mobile device 100 (step 472).

The unit of side information is then received at the mobile device 100 for use in decompressing the data requested at step 430 (step 480). Upon receipt, the unit of side information can be added to the device side information database 314 (step 482) and the requested data cached at step 458 is loaded into the decoder 103 (step 488) along with the unit of side information (step 490). The received data is then decompressed and rendered on the display 110 (step 492).

Reference is now made to FIG. 7C to describe yet another specific embodiment of obtaining the unit of side information in accordance with the method of interactive compression for communication between the server and the mobile device 100 described above with reference to FIG. 7. As described, it is determined at step 446 of FIG. 6 that the decoder 103 does not have the unit of side information identified by the unique identifier received in the response. In the present embodiment, the download of data continues and the request for the unit of side information is generated and transmitted over a second connection during the download of requested data (step 460).

The request is received at a server (step 470), which can be the same server that generated and sent the response or, alternatively can be another suitable server that has access to the repository of side information, as described above. The unit of side information is identified using the unique identifier, retrieved and transmitted from the server for delivery to the mobile device 100 over the second connection (step 472).

The unit of side information is received at the mobile device 100 for use in decompressing the data requested at step 430 (step 480). Thus, the unit of side information can be received at the mobile device 100 during receipt of the requested data. The unit of side information received at step 480 is cached (step 482), adding the unit of side information to the device side information database 314. The unit of side information is loaded into the decoder 103 (step 490) and the received data is decompressed and rendered on the display 110 (step 492).

In the embodiment described above with reference to FIGS. 6 and 7 to 7C, data is sent to the mobile device in response to receipt of a request for data. It will be appreciated that data such as email data can be sent to the mobile device 100 in a "push" operation in which a unit of side information is selected and the data is compressed and sent automatically without receipt of a request for data transmission from the mobile device 100. The remainder of the steps are similar to those described in relation to FIGS. 6 and 7 to 7C. For example, although no request for data is received from the mobile device 100, the data is received at the server and a unit of side information is selected (step 436), the side information identifier is computed (step 438) and the data is compressed (step 440) prior to transmission to the mobile device 100 (step 442).

Figure 8:
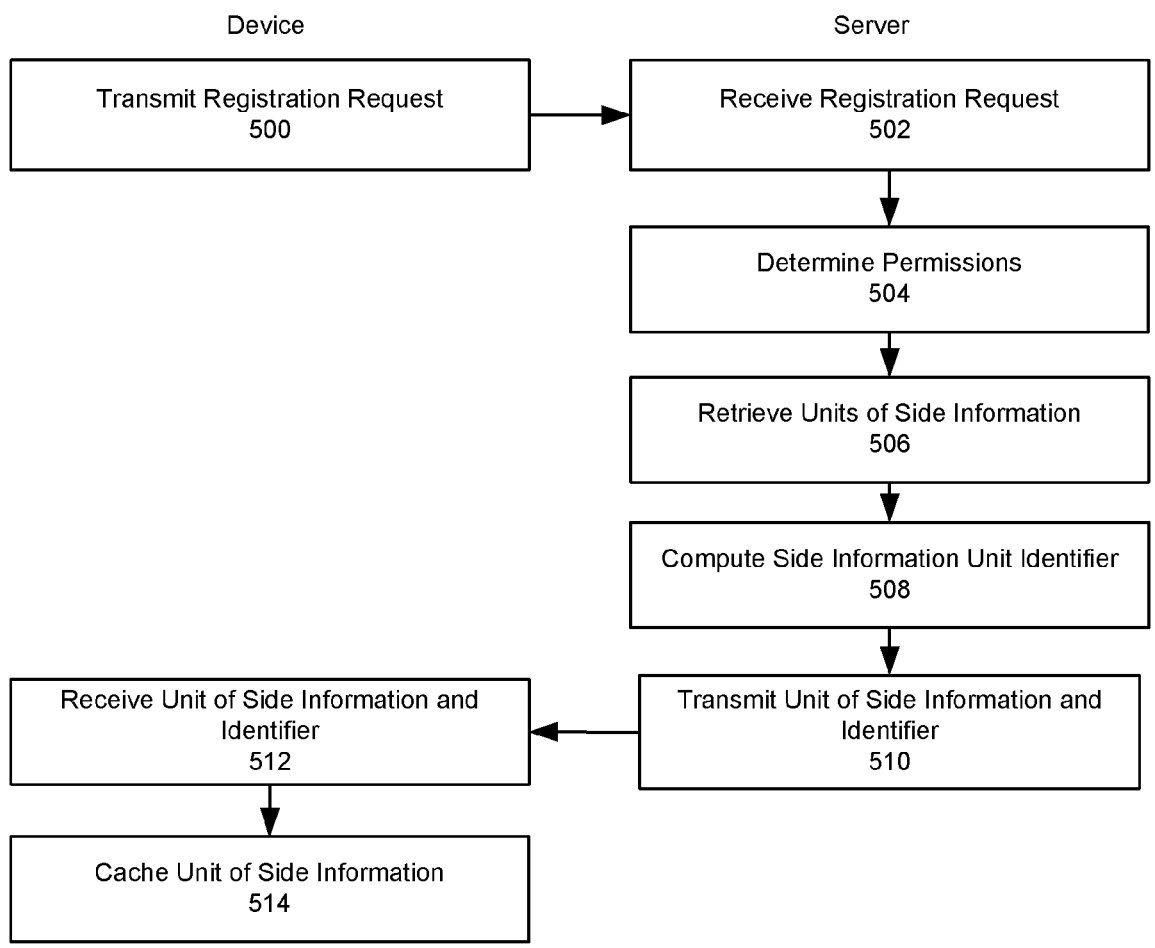
FIG. 8 is a flowchart showing a method of communicating compression state information for interactive compression according to another embodiment.

Reference is now made to FIG. 8 to describe another embodiment of a method of communicating compression state information for decompression of data. As shown in the flowchart of FIG. 8, a new device registers with a system such as the host system 250 for wireless communication therewith (step 500). The server receives a registration request (step 502) from the mobile device 100 and determines that registration of the mobile device 100 with the host system 250 is permitted (step 504). Among other operations upon registration, units of side information are retrieved from the server side information database 324 (step 506) and the respective side information identifier is calculated for each respective unit of side information retrieved for sending to the mobile device (step 508). Alternatively, the unique identifier can be stored with the side information and retrieved. Thus, the unique identifier is previously computed and stored. As described above with reference to FIG. 6, the unique identifier is employed to ensure that the decoder 103 of the mobile device 100 uses the same unit of side information for decompression as the encoder 277 uses for compression on the server side. The unique identifier can be any identifier that uniquely identifies the unit of side information, such as a hash of the bytes of side information along with other information such as the length of the side information in bytes and other information can be incorporated into the unique identifier such as a modification date and time of the unit of side information, a version number and/or a randomly generated number. The server then transmits the units of side information to the mobile device 100 along with the respective side information identifiers (step 510).

The mobile device receives the units of side information along with the respective side information identifiers (step 512) and stores the units of side information in the device side information database 314, each with their respective side information identifier (step 514) for identifying the unit of side information for later use in decompressing data.

Figure 9:
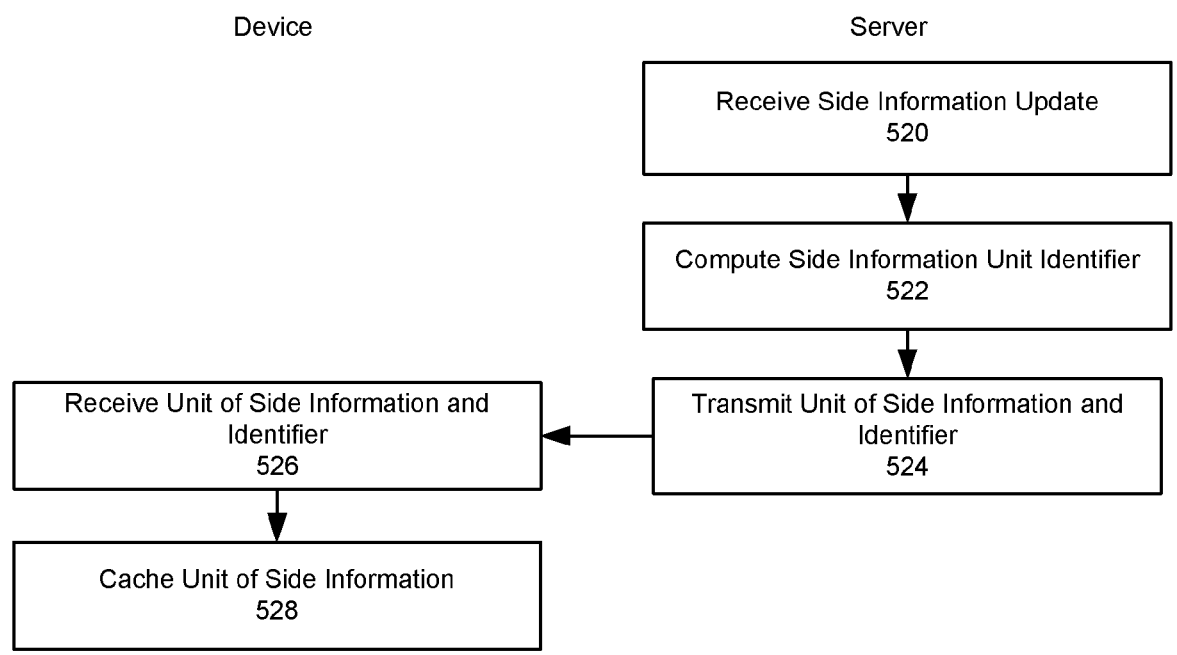
FIG. 9 is a flowchart showing a method of communicating compression state information for interactive compression according to yet another embodiment.

Reference is now made to FIG. 9. Side information updates can be sent to the mobile device at any suitable time. Units of side information can be updated at the server as a result of a side information update initiated by an enterprise or other party, for example. Alternatively, the side information can be updated for improved compression based on prior data transmission to the mobile device 100 or to a plurality of mobile devices in communication with the host system 250. Further, side information can be added as a result of the addition of capabilities such as the addition of a new document type for data transmission. For example, the addition of capabilities for transmission and receipt of a word processing document not previously supported may result in the addition of units of side information at the server. New units of side information at the server are stored in the server side information database 324. Thus, receipt of an update to the side information at the server results in storage of a new unit or units of side information at the server side information database 324 (step 520). The side information identifier is calculated (step 522) and the server sends an update command to the mobile device 100 including the new or updated unit of side information along with the side information identifier (step 524). Alternatively, the side information identifier can be calculated prior to storing the new or updated unit of side information in the server side information database 324.

The update command is received at the mobile device 100 (step 526) and the unit of side information is stored in the device side information database 314 in association with the side information identifier (step 528). Thus, the update to side information is controlled at the server side and the side information can be sent during, for example, periods of low network activity thereby using bandwidth for transmission during periods in which excess bandwidth is available or at any other suitable time. The server therefore keeps track of the side information stored at the mobile device 100 to effect updates when new units of side information are provided.

It will be appreciated that when messages are pushed to the mobile device, data may be re-ordered over the network and therefore a pushed mail message may reference a unit of side information that has not yet been received at the mobile device 100. It is possible for several messages to be received in a queue at the mobile device 100 prior to receipt of the unit of side information for decompressing the messages, for example. Further, conditions may result in the loss of a unit or units of side information. For example, removal of the battery 130, wiping of memory or certain other conditions may result in loss of units of side information stored in the device side information database 314. In such case, the server may send data for decompression using a unit of side information that is not resident on the mobile device 100. The steps in communicating compression state information in such cases are described above with reference to FIGS. 6 and 7 to 7C.

According to one aspect, there is provided a method of determining, at a mobile device, side information including compression state information. The method includes receiving, from a server, a unique side information identifier identifying a unit of side information used by the server for compressing data, determining, based on the side information identifier, if the unit of side information is resident on said device, and if the unit of side information is resident on the mobile device, loading the side information for decompressing the data. Otherwise, if the unit of side information is not resident on the mobile device, the method includes requesting the unit of side information from one of the server and another device.

According to another aspect, there is provided a method of compressing and transmitting data. The method includes receiving a request for data from a mobile device, selecting a unit of side information for compressing the data, computing a side information identifier based on a byte length along with a hash of the unit of side information, compressing the data using the unit of side information, and transmitting the side information identifier to the mobile device for identifying the unit of side information.

Other aspects and features of the present invention will become apparent to those ordinarily skilled in the art upon review of the following description of specific embodiments of the invention in conjunction with the accompanying figures.

In the present application, application-layer data compression is performed for compressing, for example, Web page content or email content. Data transmitted in a mobile device/server system in which a server asynchronously transmits data to one or more mobile devices or in which a mobile device requests data from one or more servers can be compressed using a compression method employing side information such as Yang-Kieffer (YK) compression. The side information is implemented as a shared-state between the data compressor (encoder) and the data decompressor (decoder). The use of side information in such a compression method can provide marked improvements in data compression rates, resulting in network bandwidth savings when the data is transmitted. Furthermore, the improvements in data compression also result in improved battery life of the mobile device 100 between recharging as the reduced data transmitted results in reduced transmission and receiving from the communication subsystem 104.

In a semi-static side information case, where new units of side information need not be generated and updated frequently at the encoder side, the side information is also not updated frequently at the decoder side. The side information stored at the mobile device can be updated when a unit of side information is used that the mobile device does not have. Thus, side information is only transmitted when required by the decoder at the mobile device for decompressing the data, thereby further reducing the network bandwidth required for data transmission.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
   receiving, from a server, a unique side information identifier identifying a unit of side information used by the server for compressing data;
   downloading, at a mobile device, compressed data from the server over a first connection;
   determining, based on the side information identifier, if the unit of side information is resident on the mobile device; and
   if the unit of side information is resident on the mobile device, loading the side information for decompressing the data; otherwise
   if the unit of side information is not resident on the mobile device, requesting the unit of side information from one of the server and another device over a second connection during the downloading of the compressed data over the first connection and receiving the unit of side information over the second connection during the downloading of the compressed data over the first connection.

2. The method according to claim 1, wherein the downloading of the compressed data is suspended until receipt of the unit of side information, if the unit of side information is not resident on the device.

3. The method according to claim 1 wherein the downloading of the compressed data is slowed until receipt of the unit of side information, if the unit of side information is not resident on the device.

4. The method according to claim 1, wherein the downloading of the compressed data is completed prior to requesting the unit of side information, if the unit of side information is not resident on the device.

5. The method according to claim 1, wherein receiving the side information identifier comprises receiving a byte length of the unit of side information and a hash of the bytes of the unit of side information.

6. The method according to claim 1, comprising, in response to said requesting, receiving the unit of side information and caching the unit of side information.

7. The method according to claim 1, comprising transmitting a request for downloading the compressed data to the server prior to receiving the side information identifier.

8. A mobile device comprising:
   a housing;
   a display device exposed by the housing;
   an input device;
   a memory unit within the housing; and
   a processor within the housing and operably connected to the display device, the input device and the memory unit for executing a program stored in the memory unit to cause the mobile device to transmit to a server a request for data; to download from the server compressed data over a first connection; to receive from the server, in response to the request, a unique side information identifier for decompressing the compressed data downloaded; to determine if a unit of side information identified by the side information identifier is resident on the mobile device; and if the unit of side information is resident on the mobile device, to load the side information for decompressing the compressed data; otherwise if the unit of side information is not resident on the mobile device, to request the unit of side information from one of the server and another device over a second connection during the download of the compressed data over the first connection and to receive the unit of side information over the second connection during the download of the compressed data over the first connection.

9. A computer program product comprising a non-transitory computer-readable medium having computer-readable code embodied therein for execution by a processor of a portable electronic device for transmitting a request for data to a server, downloading compressed data from the server over a first connection, receiving, in response to the request, a side information identifier from the server for decompressing compressed data, determining if a unit of side information is resident on the device based on the side information identifier, and if the unit of side information is resident on the device, loading the side information for decompressing the compressed data, otherwise if the unit of side information is not resident on the device, requesting the unit of side information from one of the server and another device over a second connection during the downloading of the compressed data over the first connection and receiving the unit of side information over the second connection during the downloading of the compressed data over the first connection.

10. A server method of sharing side information for compression and decompression of data, the method comprising:
   receiving a unit of side information for use in compressing data for transmission to a mobile device;
   computing a unique side information identifier;
   selecting the unit of side information for compressing the data for sending to a mobile device;
   compressing the data using the unit of side information; and
   transmitting to the mobile device the compressed data and the side information identifier for identifying the unit of side information for decompression of the compressed data over a first connection;
   receiving, from the mobile device, a request for the unit of side information over a second connection during the transmitting of the compressed data over the first connection if the unit of side information associated with the unique side information identifier is not found on the mobile device; and
   transmitting to the mobile device the unit of side information over the second connection, during transmitting the compressed data over the first connection, when the request for the unit of side information is received over the second connection.

11. The method according to claim 10, wherein receiving the unit of side information comprises receiving an update for the unit of side information.

12. The method according to claim 10, wherein computing the unique side information identifier comprises computing based on a byte length of the unit of side information and a hash of the unit of side information.

13. The method according to claim 10, wherein computing the unique side information identifier comprises computing based on at least one of a byte length of the unit of side information, a hash of the unit of side information, a modification date and time of the unit of side information, a version number of the unit of side information, and a randomly generated number.

14. The method according to claim 10, wherein selecting the unit of side information comprises selecting the unit of side information based on at least one of a user name and a user group.

15. The method according to claim 10, comprising receiving a request for the data from the mobile device prior to selecting the unit of side information.

* * * * *